US010530447B2

(12) United States Patent
Li et al.

(10) Patent No.: US 10,530,447 B2
(45) Date of Patent: Jan. 7, 2020

(54) USER EQUIPMENT (UE) AND METHODS FOR COMMUNICATION USING DIRECTIONAL TRANSMISSION AND RECEPTION

(71) Applicant: Intel IP Corporation, Santa Clara, CA (US)

(72) Inventors: Qian Li, Beaverton, OR (US); Huaning Niu, Milpitas, CA (US); Geng Wu, Portland, OR (US)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 15/741,619

(22) PCT Filed: Dec. 14, 2015

(86) PCT No.: PCT/US2015/065548
§ 371 (c)(1),
(2) Date: Jan. 3, 2018

(87) PCT Pub. No.: WO2017/007502
PCT Pub. Date: Jan. 12, 2017

(65) Prior Publication Data
US 2018/0198504 A1 Jul. 12, 2018

Related U.S. Application Data

(60) Provisional application No. 62/190,049, filed on Jul. 8, 2015.

(51) Int. Cl.
*H04B 7/06* (2006.01)
*H04L 5/00* (2006.01)
(Continued)

(52) U.S. Cl.
CPC ......... *H04B 7/0617* (2013.01); *H04B 7/0695* (2013.01); *H04L 5/0023* (2013.01);
(Continued)

(58) Field of Classification Search
CPC .................................................... H04B 7/0617
(Continued)

(56) References Cited

U.S. PATENT DOCUMENTS

2007/0135172 A1* 6/2007 Lysejko ............... H04W 16/28
455/562.1
2009/0180413 A1* 7/2009 Sutton ............... H04W 52/0225
370/311
(Continued)

FOREIGN PATENT DOCUMENTS

CN 107852291 3/2018
WO WO-2014098542 A1 6/2014

OTHER PUBLICATIONS

"International Application Serial No. PCT US2015 065548, International Preliminary Report on Patentability dated Jan. 18, 2018", 15 pgs.
(Continued)

*Primary Examiner* — Lihong Yu
(74) *Attorney, Agent, or Firm* — Schwegman Lundberg & Woessner, P.A.

(57) ABSTRACT

Embodiments of an Evolved Node-B (eNB), User Equipment (UE) and methods for directional communication are generally described herein. The eNB may transmit, signal and an uplink scheduling block to a first UE according to a downlink transmission direction from the eNB to the first UE. The eNB 104 may further transmit, during the downlink sub-frame, a second beam refinement training signal and a downlink scheduling block to a second UE according to a downlink transmission direction from the eNB to the second UE. The uplink scheduling block may indicate scheduled uplink resources for a scheduled uplink transmission by the first UE and the downlink scheduling block may indicate scheduled downlink resources for a scheduled downlink transmission to the second UE.

27 Claims, 11 Drawing Sheets

(51) Int. Cl.
 *H04W 72/12* (2009.01)
 *H04W 72/04* (2009.01)

(52) U.S. Cl.
 CPC .......... *H04L 5/0044* (2013.01); *H04L 5/0048* (2013.01); *H04L 5/0053* (2013.01); *H04W 72/1205* (2013.01); *H04W 72/042* (2013.01)

(58) Field of Classification Search
 USPC ........................................................ 375/267
 See application file for complete search history.

(56) References Cited

U.S. PATENT DOCUMENTS

| | | |
|---|---|---|
| 2010/0111215 A1 | 5/2010 | Nandagopalan et al. |
| 2011/0317595 A1* | 12/2011 | Kanda .................. H04B 7/0408 370/277 |
| 2013/0286960 A1 | 10/2013 | Li et al. |
| 2014/0044044 A1 | 2/2014 | Josiam et al. |
| 2014/0071961 A1 | 3/2014 | Nigam et al. |
| 2014/0093005 A1 | 4/2014 | Xia et al. |
| 2014/0126509 A1 | 5/2014 | You |

OTHER PUBLICATIONS

"International Application Serial No. PCT/US2015/065548, International Search Report dated Apr, 11, 2016", 4 pgs.
"International Application Serial No. PCT/US2015/065548, Written Opinion dated Apr. 11, 2016", 13 pgs.
"European Application Serial No. 15897892.4, Extended European Search Report dated Jan. 30, 2019", 9 pgs.
"European Application Serial No. 15897892.4, Response filed Aug. 2, 2019 to Extended European Search Report dated Jan. 30, 2019", 32 pgs.

* cited by examiner

USER EQUIPMENT (UE) AND METHODS FOR COMMUNICATION USING DIRECTIONAL TRANSMISSION AND RECEPTION

PRIORITY CLAIM

This application claims is a U.S. National Stage Filing under 35 U.S.C. 371 from International Application No. PCT/US2015/065548, filed Dec. 14, 2015 and published in English as WO 2017/007502 on Jan. 12, 2017, which priority to U.S. Provisional Patent Application Ser. No. 62/190,049, filed Jul. 8, 2015, each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks, although the scope of the embodiments is not limited in this respect. Some embodiments relate to directional transmission of signals. Some embodiments relate to directional reception of signals. Some embodiments relate to millimeter wave (mmWave) communication. Some embodiments relate to antenna diversity. Some embodiments relate to Fifth Generation (5G) networks.

BACKGROUND

A mobile network may support communication with mobile devices. In some cases, a mobile device may experience degradation in performance for any number of reasons. As an example, the mobile device may be out of coverage of base stations in the network. As another example, the mobile device may experience a reduction in signal quality in a challenging environment. In such scenarios, a performance of the device and/or a user experience may suffer. Accordingly, there is a general need for methods and systems for improving coverage and/or signal quality in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
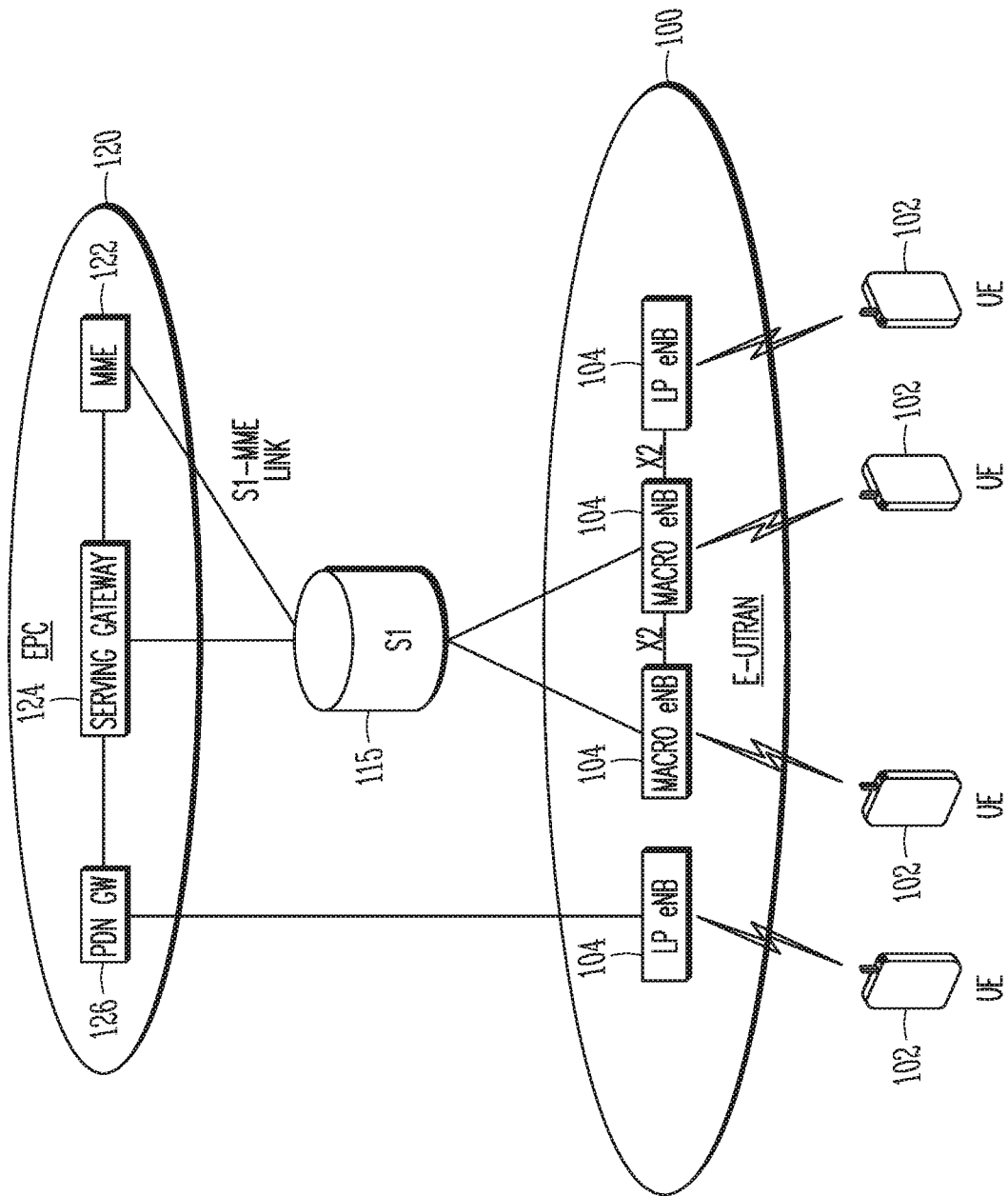
FIG. 1 is a functional diagram of a 3GPP network in accordance with some embodiments.

FIG. 1 is a functional diagram of a 3GPP network in accordance with some embodiments. It should be noted that embodiments are not limited to the example 3GPP network shown in FIG. 1, as other networks may be used in some embodiments. As an example, a Fifth Generation (5G) network may be used in some cases. As another example, a network that supports millimeter wave (mmWave) communication may be used in some cases. Such networks may or may not include some or all of the components shown in FIG. 1, and may include additional components and/or alternative components in some cases.

The network comprises a radio access network (RAN) (e.g., as depicted, the E-UTRAN or evolved universal terrestrial radio access network) 100 and the core network 120 (e.g., shown as an evolved packet core EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs.

In some embodiments, the eNB 104 may transmit, during a downlink sub-frame, a first beam refinement training signal and an uplink scheduling block to a first UE 102 according to a downlink transmission direction from the eNB 104 to the first UE 102. The eNB 104 may further transmit, during the downlink sub-frame, a second beam refinement training signal and a downlink scheduling block to a second UE 102 according to a downlink transmission direction from the eNB 102 to the second UE 102. The UE 102 may receive one or more downlink data blocks from the eNB 104 during the downlink sub-frame. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (e.g., assigning control and shared channel resource blocks to UEs 102 within a cell) may be performed at the eNB 104 based on channel quality information fed back from the UEs 102 to the eNB 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
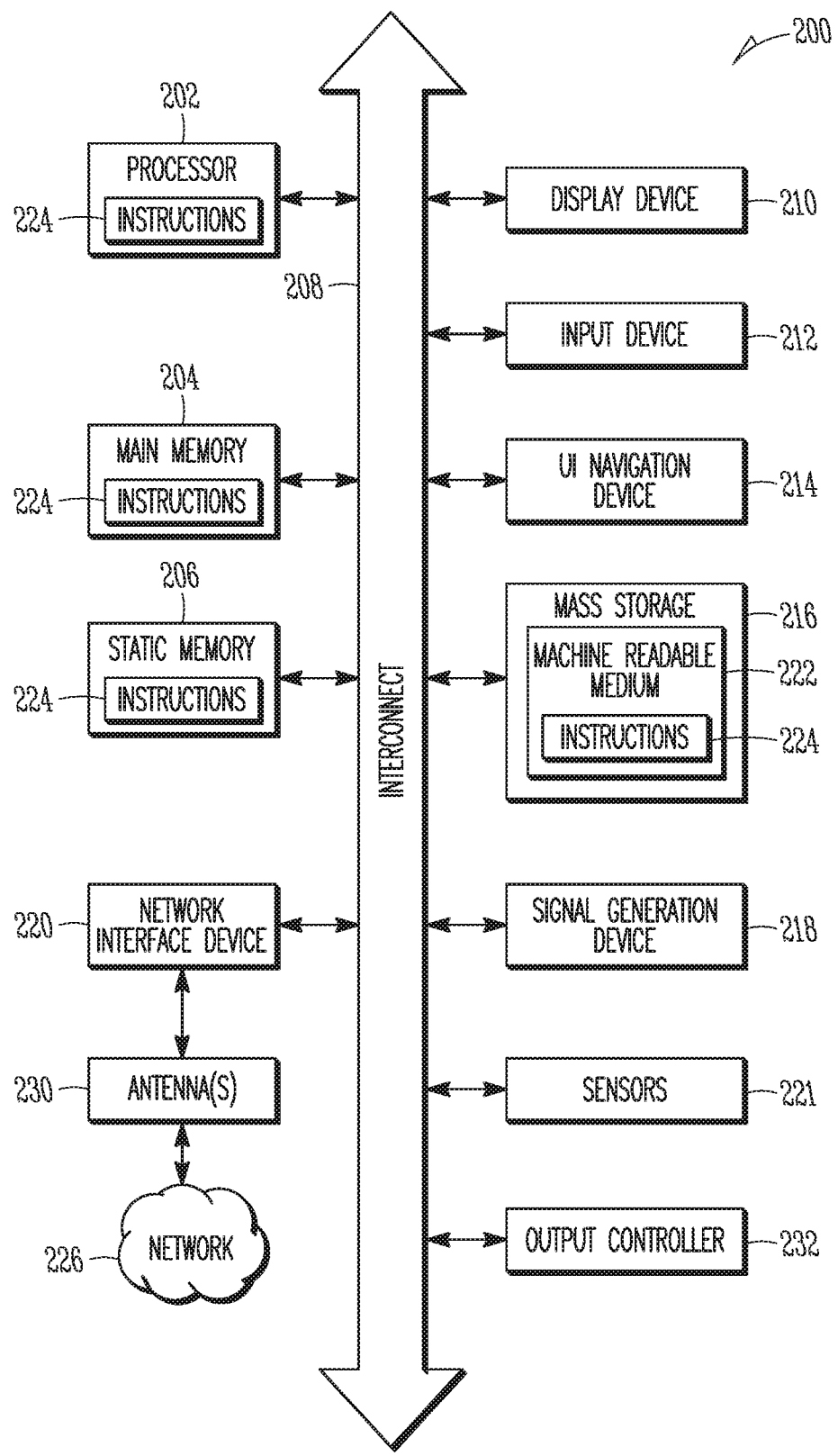
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, access point (AP), station (STA), mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g. a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
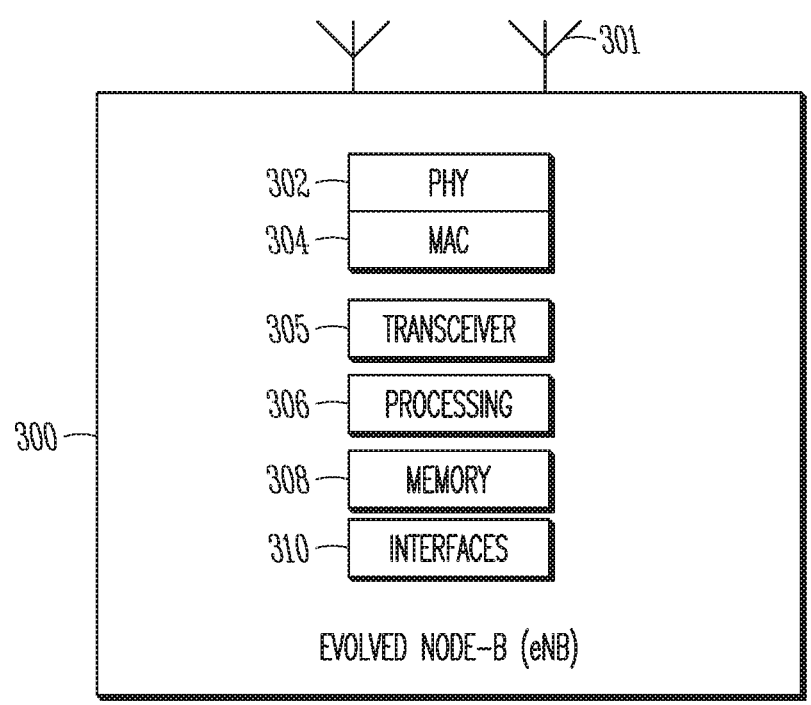
FIG. 3 is a block diagram of an Evolved Node-B (eNB) in accordance with some embodiments.

FIG. 3 is a block diagram of an Evolved Node-B (eNB) in accordance with some embodiments. It should be noted that in some embodiments, the eNB 300 may be a stationary non-mobile device. The eNB 300 may be suitable for use as an eNB 104 as depicted in FIG. 1. The eNB 300 may include physical layer circuitry 302 and a transceiver 305, one or both of which may enable transmission and reception of signals to and from the UE 200, other eNBs, other UEs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof. It should be noted that in some embodiments, an eNB or other base station may include some or all of the components shown in either FIG. 2 or FIG. 3 or both.

Figure 4:
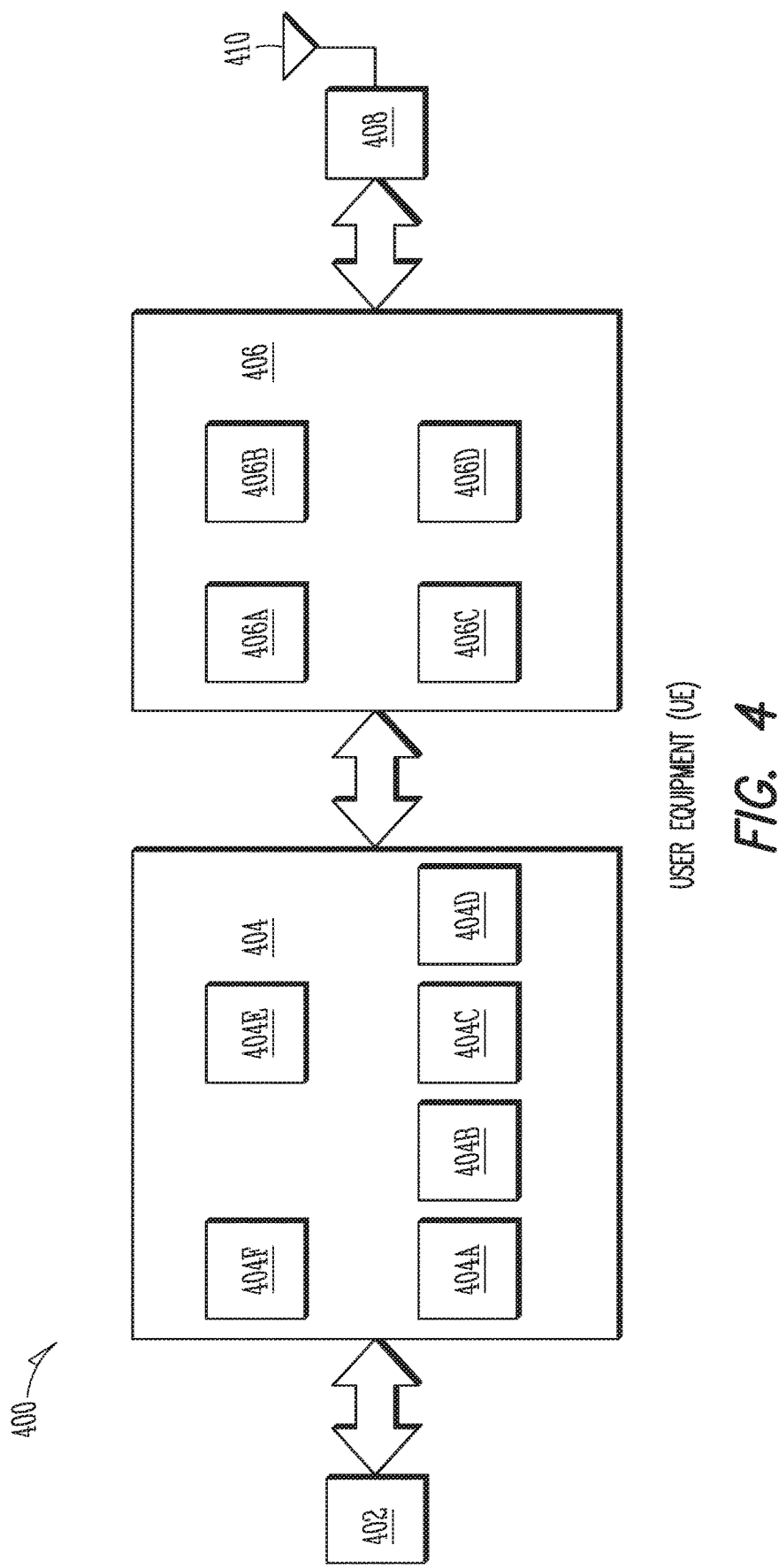
FIG. 4 is a block diagram of a User Equipment (UE) in accordance with some embodiments.

FIG. 4 is a block diagram of a User Equipment (UE) in accordance with some embodiments. The UE 400 may be suitable for use as a UE 102 as depicted in FIG. 1. In some embodiments, the UE 400 may include application circuitry 402, baseband circuitry 404, Radio Frequency (RF) circuitry 406, front-end module (FEM) circuitry 408 and one or more antennas 410, coupled together at least as shown. In some embodiments, other circuitry or arrangements may include one or more elements and/or components of the application circuitry 402, the baseband circuitry 404, the RF circuitry 406 and/or the FEM circuitry 408, and may also include other elements and/or components in some cases. As an example, "processing circuitry" may include one or more elements and/or components, some or all of which may be included in the application circuitry 402 and/or the baseband circuitry 404. As another example, "transceiver circuitry" may include one or more elements and/or components, some or all of which may be included in the RF circuitry 406 and/or the FEM circuitry 408. These examples are not limiting, however, as the processing circuitry and/or the transceiver circuitry may also include other elements and/or components in some cases. It should be noted that in some embodiments, a UE or other mobile device may include some or all of the components shown in either FIG. 2 or FIG. 4 or both.

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 404 may include circuitry such as, but not limited to, one or more single-core or multi-core processors. The baseband circuitry 404 may include one or more baseband processors and/or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a second generation (2G) baseband processor 404a, third generation (3G) baseband processor 404b, fourth generation (4G) baseband processor 404c, and/or other baseband processor(s) 404d for other existing generations, generations in development or to be developed in the future (e.g., fifth generation (5G), 6G, etc.). The baseband circuitry 404 (e.g., one or more of baseband processors 404a-d) may handle various radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (EFT), precoding, and/or constellation mapping/demapping functionality. In some embodiments, encoding/decoding circuitry of the baseband circuitry 404 may include convolution, tail-biting convolution, turbo, Viterbi, and/or Low Density Parity Check (LDDC) encoder/decoder functionality. Embodiments of modulation/demodulation and encoder/decoder functionality are not limited to these examples and may include other suitable functionality in other embodiments.

In some embodiments, the baseband circuitry 404 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 404e of the baseband circuitry 404 may be configured to run elements of the protocol stack for signaling of the PHY, MAC, RLC, PDCP and/or RRC layers. In some embodiments, the baseband circuitry may include one or more audio digital signal processor(s) (DSP) 404f. The audio DSP(s) 404f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the RF circuitry 406 may include a receive signal path and a transmit signal path. The receive signal path of the RF circuitry 406 may include mixer circuitry 406a, amplifier circuitry 406b and filter circuitry 406c. The transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect. In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c. The filter circuitry 406c may include a low-pass filter (LPF), although the scope of the embodiments is not limited in this respect.

In some embodiments, the mixer circuitry 406a of the receive signal path and the mixer circuitry 406a of the transmit signal path may include two or more mixers and may be arranged for quadrature downconversion and/or upconversion respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and/or direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406. In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider. The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer. In some embodiments, frequency input may be provided by a voltage controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410.

In some embodiments, the FEM circuitry 408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410. In some embodiments, the UE 400 may include additional elements such as, for example, memory/storage, display, camera, sensor, and/or input/output (I/O) interface.

The antennas 230, 301, 410 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 230, 301, 410 may be effectively separated to take advantage of spatial diversity and the different channel characteristics that may result.

In some embodiments, the UE 400 and/or the eNB 300 may be a mobile device and may be a portable wireless communication device, such as a personal digital assistant (PDA), a laptop or portable computer with wireless communication capability, a web tablet, a wireless telephone, a smartphone, wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 400 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 400, eNB 300 or other device may include one or more of a keyboard, a display, a non-volatile memory port, multiple antennas, a graphics processor, an application processor, speakers, and other mobile device elements. The display may be an LCD screen including a touch screen.

Although the UE 400 and the eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 400 and/or eNB 300 and/or machine 200 may include various components of the UE 200 and/or the eNB 300 and/or the machine 200 as shown in FIGS. 2-4. Accordingly, techniques and operations described herein that refer to the UE 400 (or 102) may be applicable to an apparatus for a UE. In addition, techniques and operations described herein that refer to the eNB 300 (or 104) may be applicable to an apparatus for an eNB.

In accordance with embodiments, the eNB 104 may transmit, during a downlink sub-frame, a first beam refinement training signal and an uplink scheduling block to a first UE 102 according to a downlink transmission direction from the eNB 104 to the first UE 102. The eNB 104 may further transmit, during the downlink sub-frame, a second beam refinement training signal and a downlink scheduling block to a second UE 102 according to a downlink transmission direction from the eNB 102 to the second UE 102. The UE 102 may receive one or more downlink data blocks from the eNB 104 during the downlink sub-frame. The uplink scheduling block may indicate scheduled uplink resources for a scheduled uplink transmission by the first UE 102 and the downlink scheduling block may indicate scheduled downlink resources for a scheduled downlink transmission to the second UE 102. These embodiments are described in more detail below.

Figure 5:
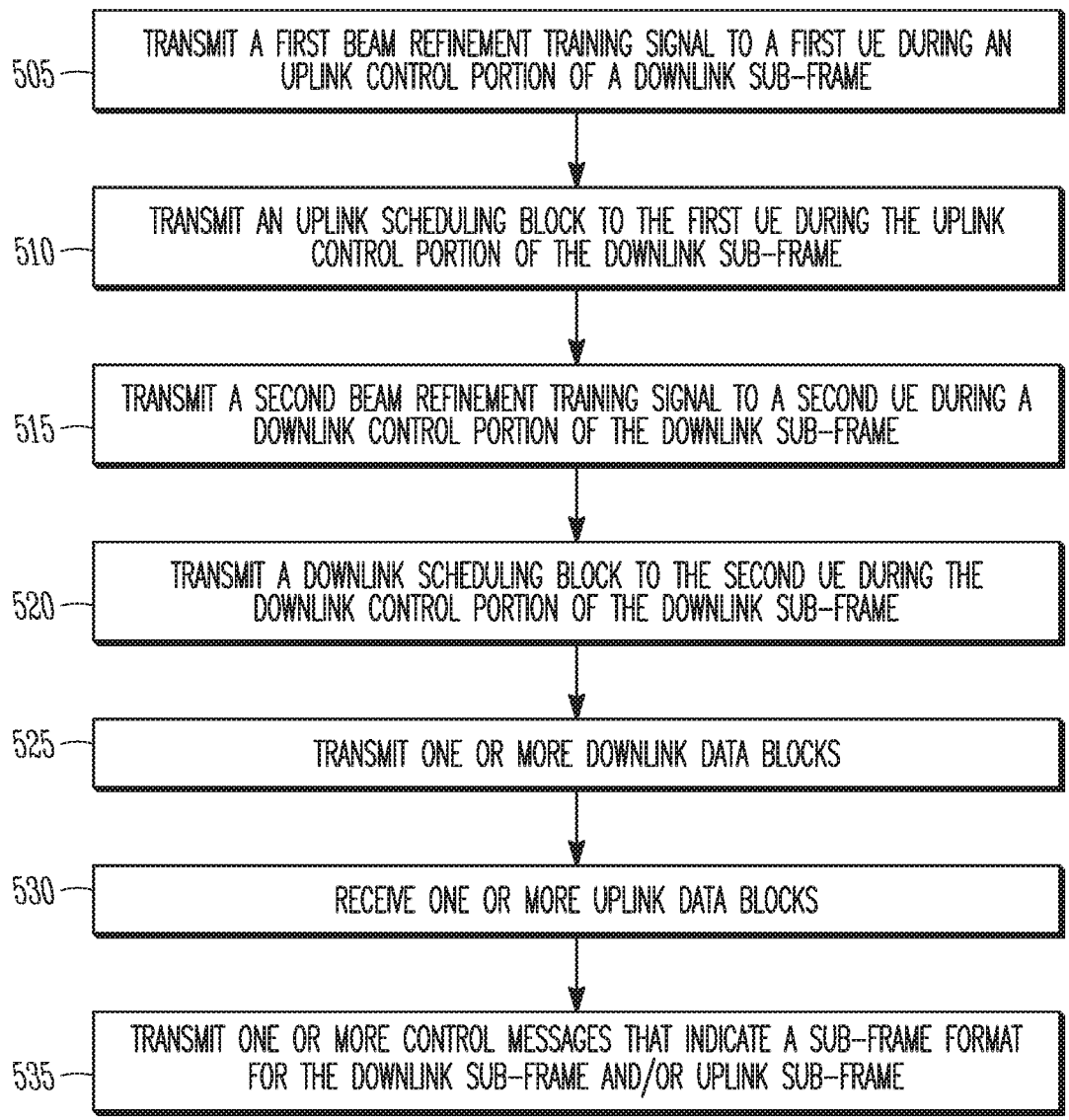
FIG. 5 illustrates the operation of a method of communication in accordance with some embodiments.

FIG. 5 illustrates the operation of a method of communication in accordance with some embodiments. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-11, although it is understood that the method 500 may be practiced with any other suitable systems, interfaces and components.

In addition, while the method 500 and other methods described herein may refer to eNBs 104 or UEs 102 operating in accordance with 3GPP or other standards, embodiments of those methods are not limited to just those eNBs 104 or UEs 102 and may also be practiced on other devices, such as a Wi-Fi access point (AP) or user station (STA). In addition, the method 500 and other methods described herein may be practiced by wireless devices configured to operate in other suitable types of wireless communication systems, including systems configured to operate according to various IEEE standards such as IEEE 802.11. The method 500 and other methods described herein may be practiced by wireless devices configured to communicate in millimeter wave (mmWave) frequency bands and/or in networks that support mmWave communication. The method 500 may also refer to an apparatus for a UE 102 and/or eNB 104 and/or other device described above.

At operation 505 of the method 500, the eNB 104 may transmit, to a first UE 102, a first beam refinement training signal during a downlink sub-frame. At operation 510, the eNB 104 may transmit, to the first UE 102, an uplink scheduling block during the downlink sub-frame. In some embodiments, the uplink scheduling block may indicate scheduled uplink resources to be used by the first UE 102 for a scheduled uplink transmission by the first UE 102. Accordingly, the scheduled uplink resources may include time resources (such as an uplink sub-frame index, OFDM symbols within an uplink sub-frame or other time unit) to be used. The scheduled uplink resources may also include frequency resources (such as a resource blocks (RBs), resource elements (REs), sub-channel or other frequency unit) to be used.

In some embodiments, beam refinement training signals may include or may be based on any group of bits and/or symbols, which may be known, predetermined and/or determinable by the eNB 104 and the UEs 102. As an example, a formula or technique for determination of a template may be used. In some cases, variable parameters (such as seeds or other) may be used for such formulas or techniques. As another example, the TSs may be based on any suitable pattern and/or template of bits and/or symbols in the time domain or in the frequency domain, in some cases.

In some embodiments, the first beam refinement training signal and the uplink scheduling block may be transmitted to the first UE 102 when an uplink data transmission (or other uplink transmission) by the first UE 102 has been scheduled by the eNB 104. As another non-limiting example, the eNB 104 may transmit one or more beam refinement training signals and one or more uplink scheduling blocks to one or more UEs 102 for which uplink transmissions are scheduled. Furthermore, in some cases, the UEs 102 to which the beam refinement training signals and uplink scheduling blocks are transmitted may be restricted to UEs 102 for which uplink transmissions are scheduled.

As a non-limiting example, the first beam refinement training signal and the uplink scheduling block may be transmitted according to a downlink transmit direction from the eNB 104 to the first UE 102. The first beam refinement training signal may enable the first UE 102 to perform beam tracking, beam refinement and/or tracking of the downlink transmission direction from the eNB 104 to the first UE 102. As a non-limiting example, the first UE 102 may use the first beam refinement training signal to modify an antenna direction for reception of the uplink scheduling block, in which case the uplink scheduling block may be transmitted to the first UE 102 after the first beam refinement training signal. As another non-limiting example, the first beam refinement training signal may be transmitted after the uplink scheduling block, in which case a previously determined antenna direction may be used by the first UE 102 for reception of the uplink scheduling block. As another non-limiting example, the beam refinement training signal and the uplink scheduling block may be considered, or may be transmitted as, a pair in some cases.

In some embodiments, one or more beam refinement training signals and/or one or more uplink scheduling blocks may be transmitted, in an uplink control portion of the downlink sub-frame, to one or more UEs 102 for which uplink transmissions are scheduled. It should be noted that embodiments are not necessarily limited to usage of an uplink control portion. For instance, the downlink sub-frame that may not necessarily include such a designated uplink control portion.

As an example, when OFDM transmission is used by the eNB 104 for the downlink sub-frame, a first group of one or more OFDM symbol periods may be allocated for transmission of beam refinement training signals to the UEs 102 for which uplink transmissions are scheduled. A second group of one or more OFDM symbol periods may be allocated for transmission of uplink scheduling blocks to those UEs 102. The first group of OFDM symbols may occur before or after the second group of OFDM symbols. The two groups may be adjacent in time, in some cases, although embodiments are not limited as such. In addition, the two groups may be non-overlapping in time, in some cases, although embodiments are not limited to non-overlapping arrangements. Accordingly, in an example overlapping arrangement, one or more OFDM symbols may be used for transmission of beam refinement training signals and uplink scheduling blocks. For instance, different channel resources may be allocated and/or used for the transmission of beam refinement training signals and uplink scheduling blocks in such cases.

At operation 515 of the method 500, the eNB 104 may transmit, to a second UE 102, a second beam refinement training signal during the downlink sub-frame. At operation 520, the eNB 104 may transmit, to the second UE 102, a downlink scheduling block during the downlink sub-frame. In some embodiments, the downlink scheduling block may indicate scheduled downlink resources in which the second UE 102 is to receive a scheduled downlink transmission from the eNB 104. Accordingly, the scheduled downlink resources may include time resources (such as a downlink sub-frame index, OFDM symbols within a downlink sub-frame or other time unit) to be used. The scheduled downlink resources may also include frequency resources (such as resource blocks (RBs), resource elements (REs), sub-channel or other frequency unit) to be used.

As a non-limiting example, the second beam refinement training signal and the downlink scheduling block may be transmitted to the second UE 102 when a downlink data transmission (or other downlink transmission) for the second UE 102 has been scheduled by the eNB 104. As another non-limiting example, the eNB 104 may transmit one or more beam refinement training signals and one or more downlink scheduling blocks to one or more UEs 102 for which downlink transmissions are scheduled. Furthermore, in some cases, the UEs 102 to which the beam refinement training signals and downlink scheduling blocks are transmitted may be restricted to UEs 102 for which downlink transmissions are scheduled.

In some embodiments, the second beam refinement training signal and the downlink scheduling block may be transmitted according to a downlink transmit direction from the eNB 104 to the second UE 102. The second beam refinement training signal may enable the second UE 102 to perform beam tracking, beam refinement and/or tracking of the downlink transmission direction from the eNB 104 to the second UE 102. As a non-limiting example, the second UE 102 may use the first beam refinement training signal to modify an antenna direction for reception of the downlink scheduling block, in which case the downlink scheduling block may be transmitted to the second UE 102 after the second beam refinement training signal. As another non-limiting example, the second beam refinement training signal may be transmitted after the downlink scheduling block, in which case a previously determined antenna direction may be used by the second UE 102 for reception of the downlink scheduling block.

In some embodiments, one or more beam refinement training signals and/or one or more downlink scheduling blocks may be transmitted, in a downlink control portion of the downlink sub-frame, to one or more UEs 102 for which downlink transmissions are scheduled. It should be noted that embodiments are not necessarily limited to usage of a downlink control portion. For instance, the downlink sub-frame that may not necessarily include such a designated downlink control portion.

As an example, when OFDM transmission is used by the eNB 104 for the downlink sub-frame as previously described, a third group of OFDM symbols may be allocated for transmission of beam refinement training signals to the UEs 102 for which downlink transmissions are scheduled. In addition, a fourth group of OFDM symbols may be allocated for transmission of downlink scheduling blocks to those UEs 102. As described previously regarding the first and second groups of OFDM symbols, the third and fourth groups may be adjacent or non-adjacent and may be overlapping or non-overlapping. In some cases, the third group may appear before the fourth group. In other cases, the fourth group may appear before the third group. In addition, in some cases when the third and fourth groups overlap, different channel resources may be allocated and/or used for the transmission of beam refinement training signals and downlink scheduling blocks.

At operation 525 of the method 500, the eNB 104 may transmit one or more downlink data blocks to the second UE 102 in the downlink time resources and/or downlink frequency resources included in the scheduled downlink resources (indicated by the corresponding downlink scheduling block) for the second UE 102. In some cases, the downlink time resources may be included in the downlink sub-frame, in which case the same downlink sub-frame in which the downlink scheduling block is transmitted may also be used for the transmission of the one or more data blocks. In some embodiments, the downlink data blocks may be transmitted according to the downlink transmission direction between the eNB 104 and the second UE 102 used for transmission of the downlink scheduling block to the second UE 102.

It should also be noted that in some embodiments, the eNB 104 may transmit one or more data blocks to multiple UEs 102 during the downlink data frame. As an example, downlink scheduling blocks for those multiple UEs 102 may also be transmitted during the same downlink sub-frame. This example is not limiting, however, as downlink scheduling blocks may be used, in some embodiments, to indicate scheduled downlink transmissions in subsequent downlink sub-frames.

It should be noted that directional links between the eNB 104 and different UEs 102 may be different, in some cases. As an example, at least some of the directional links from the eNB 104 to the UEs 102 to which uplink scheduling blocks are transmitted may be different. As another example, at least some of the directional links from the eNB 104 to the UEs 102 to which downlink scheduling blocks are transmitted may be different.

At operation 530, the eNB 104 may receive one or more uplink data blocks from the first UE 102 in the uplink time resources and/or uplink frequency resources included in the scheduled uplink resources (indicated by the corresponding downlink scheduling block) for the first UE 102. In some cases, the uplink time resources may occur after the downlink sub-frame, although embodiments are not limited as such. In some embodiments, uplink frequency resources may be non-overlapping with downlink frequency resources used for transmission, by the eNB 104, of the downlink scheduling block (such as in a frequency division duplex (FDD) format). In some embodiments, uplink frequency resources may be the same as or overlapping with the downlink frequency resources used for transmission, by the eNB 104, of the downlink scheduling block (such as in a time division duplex (TDD) format).

It should also be noted that in some embodiments, the eNB 104 may receive one or more data blocks from multiple UEs 102 during the uplink data frame. As an example, the uplink data blocks may be received in uplink sub-frames that occur after the downlink sub-frame in which corresponding uplink scheduling blocks are transmitted by the eNB 104. This example is not limiting, however, as it may be possible for an uplink data block to be transmitted by the UE 102 in an uplink sub-frame that at least partly overlaps the downlink sub-frame in some cases.

In some embodiments, the eNB 104 and/or UEs 102 may use previously determined downlink transmission directions for transmissions and/or receptions such as those in operations 505-530. As an example, the downlink transmission direction from the eNB 104 to the first UE 102 may be based on previously determined beam-forming weights for a directional link from the eNB 104 to the first UE 102. The downlink transmission direction from the eNB 104 to the second UE 102 may be based on previously determined beam-forming weights for a directional link from the eNB 104 to the second UE 102.

In some embodiments, the eNB 104 and the UEs 102 may be arranged to transmit and/or receive at millimeter wave (mmWave) frequencies. As an example, frequencies in the range of 6 GHz or higher may be used. For systems operating in the mmWave frequency bands, various techniques may be used to provide antenna gains that may be higher than those used by devices and systems operating in lower frequency bands, in some cases. As an example, directional antennas may be used. Accordingly, sub-frame formats used for the downlink and/or uplink may be designed to accommodate directional transmission and/or reception, in some cases. Although some sub-frame formats described herein may be used for mmWave operation and may be referred to as "mmWave downlink sub-frame format" or "mmWave uplink sub-frame format," it is understood that techniques described herein may be applicable to systems and/or devices operating in other frequency bands, in some cases.

As an example, a mmWave downlink sub-frame format may include an uplink control portion, a downlink control portion, and a downlink data portion. The uplink control portion may be allocated for transmission, by the eNB 104, of beam refinement training signals and uplink scheduling blocks to UEs 102 for which uplink transmissions are scheduled. The downlink control portion may be allocated for transmission, by the eNB 104, of beam refinement training signals and downlink scheduling blocks to UEs 102 for which downlink transmissions are scheduled. Although not limited as such, the downlink transmission may be scheduled in time resources included in the data portion of the mmWave downlink sub-frame in some cases. However, it is possible that such time resources may be included in a subsequent mmWave downlink sub-frame in some cases.

Different mmWave downlink sub-frame formats are possible, and one or more of those formats may be used in some or all embodiments described herein. It should be noted that embodiments are not limited to the example mmWave downlink sub-frame formats and/or mmWave uplink sub-frame formats described herein, in terms of ordering of different portions, number of portions included, types of portions or other aspects. As an example, a system may use a first or a second mmWave downlink sub-frame format.

A first mmWave downlink sub-frame format may include beam refinement signals transmitted before corresponding scheduling blocks. When the downlink sub-frame is formatted according to the first mmWave downlink sub-frame format, the transmission of the beam refinement training signals during the uplink control portion may be performed before the transmission of the uplink scheduling blocks. In addition, the transmission of the beam refinement training signals during the downlink control portion may be performed before the transmission of the downlink scheduling blocks when the first mmWave downlink sub-frame format is used.

A second mmWave downlink sub-frame format may include beam refinement signals transmitted after corresponding scheduling blocks. When the downlink sub-frame is formatted according to the second mmWave downlink sub-frame format, the transmission of the beam refinement training signals during the uplink control portion may be performed after the transmission of the uplink scheduling blocks. In addition, the transmission of the beam refinement training signals during the downlink control portion may be performed after the transmission of the downlink scheduling blocks when the second mmWave downlink sub-frame format is used.

As a non-limiting example, a system may flexibly configure the mmWave sub-frame formats based on factors such as loading. For instance, the first mmWave downlink sub-frame format may be used when a number of active UEs 102 is below a predetermined threshold and the second mmWave downlink sub-frame format is used when the number of active UEs 102 is not below the predetermined threshold. That is, the first format may be used when the system is lightly loaded and the second format may be used when the system is heavily loaded.

Referring back to the method 500, at operation 535, one or more control messages, such as radio resource control (RRC) or other, may be transmitted from the eNB 104 to indicate downlink and/or uplink sub-frame formats to be used. As an example, such messages may be transmitted during setup. As another example, such messages may be transmitted in response to changes in loading or other factors to enable a change in the downlink and/or uplink sub-frame format being used.

A mmWave uplink sub-frame format may include any number of portions. The portions may be used for transmission, by the UE 102, of any or all of uplink sounding signals, ACK/NAK bits or indicators, scheduling requests (SR), buffer status report (BSR) packets, uplink data blocks and/or other parameters, data blocks and/or control blocks. As an example, an uplink sounding portion may be allocated for transmission, by UEs 102, of uplink sounding signals. For instance, the sounding signals may be used by the eNB 104 for operations such as channel estimation and/or beam tracking. As a non-limiting example, when OFDM transmission is used, time resources for the uplink sounding portion may include a group of one or more OFDM symbols and channel resources (frequency resources) may include a group of one or more RBs, REs, sub-channels or other frequency unit. As another example, uplink data transmitted may include one or more physical uplink shared channel (PUSCH) blocks in some cases. The PUSCH blocks may be included in an uplink data portion in some cases. The PUSCH blocks, SRs, BSRs and other elements may be included in 3GPP standards or other standards, but embodiments are not limited as such. Similar parameters, data blocks and/or control blocks, which may or may not be part of a standard may also be used in some embodiments.

Figure 6:
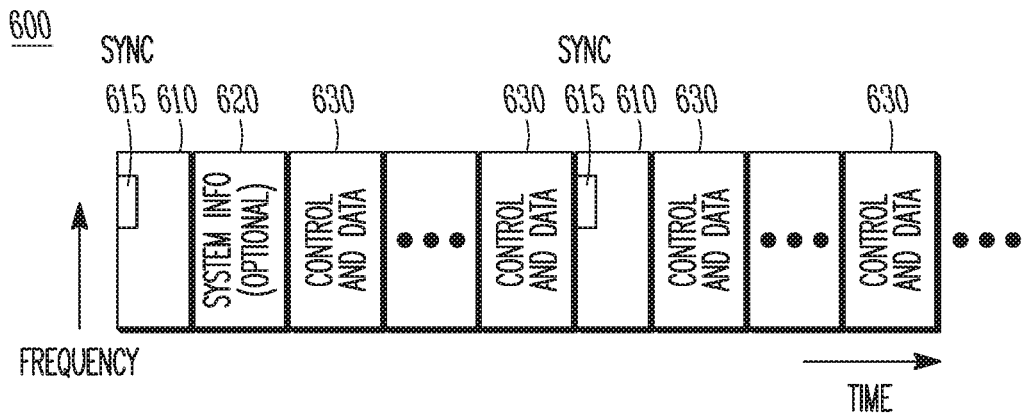
FIG. 6 illustrates example frames and sub-frames in accordance with some embodiments.
Figure 6:
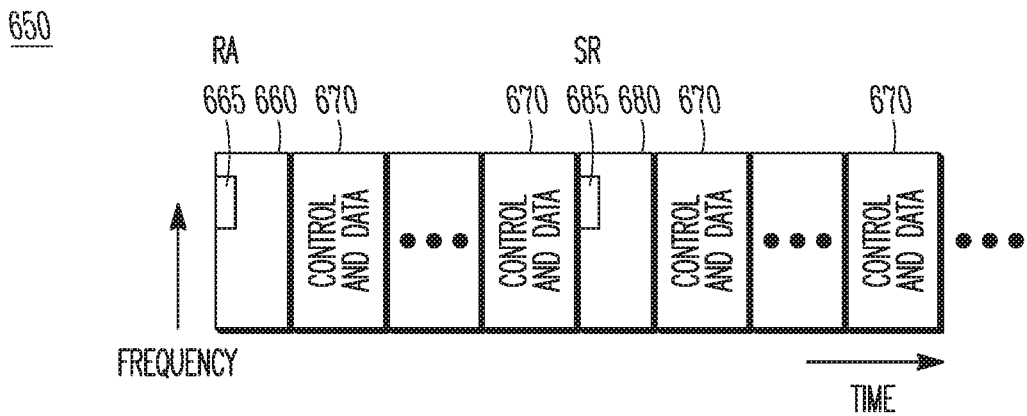
Figure 7:
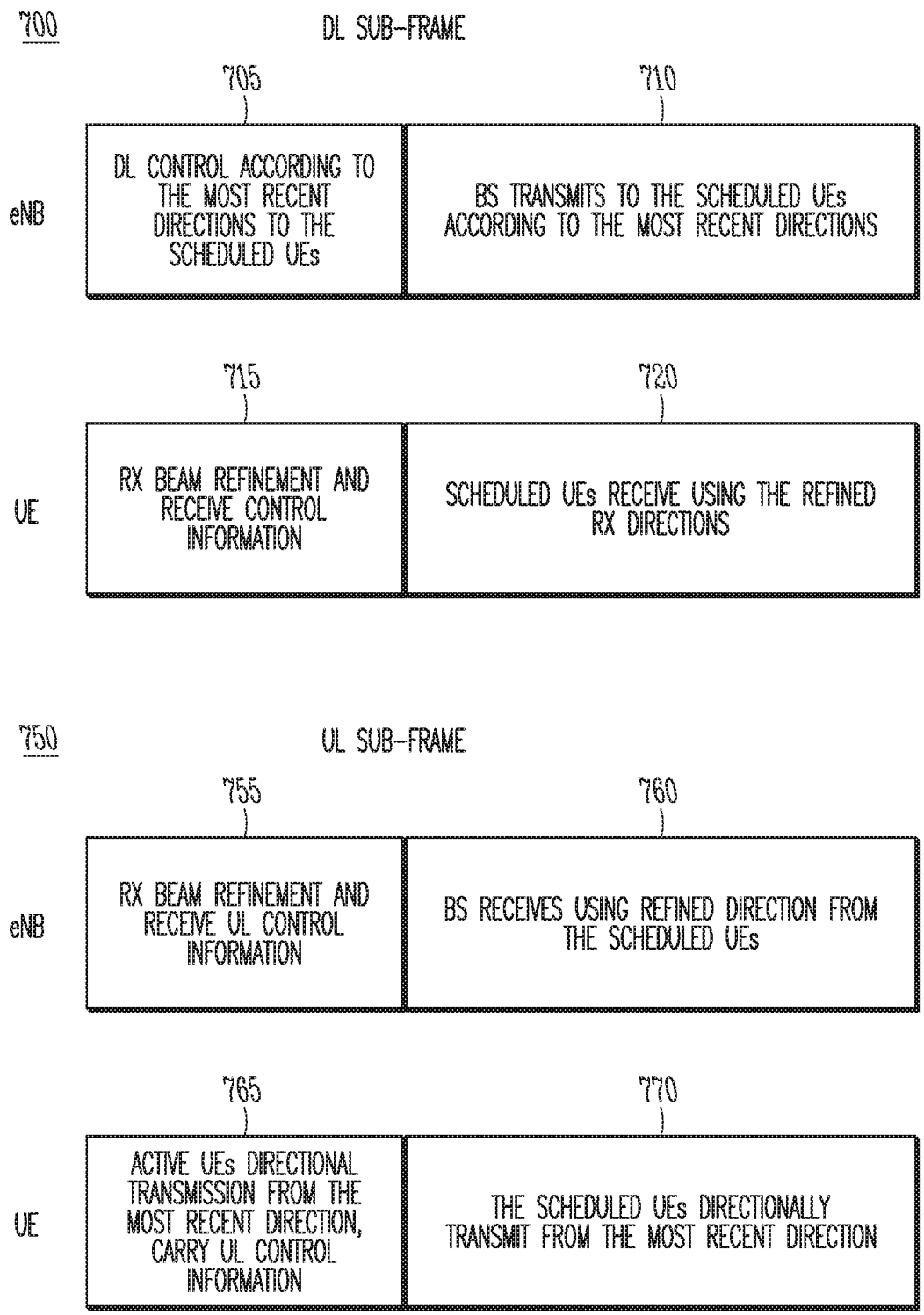
FIG. 7 illustrates example sub-frames in accordance with some embodiments.
Figure 8:
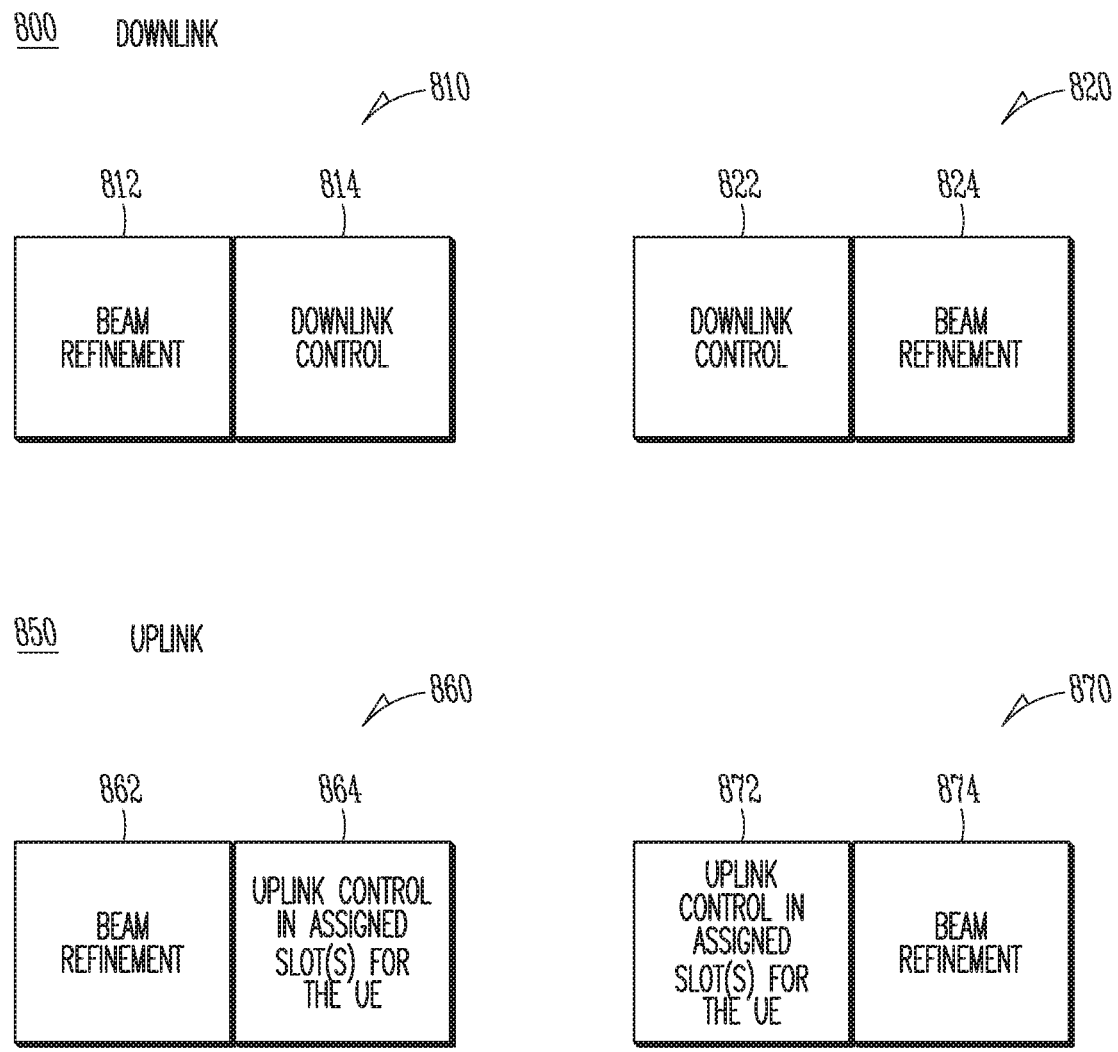
FIG. 8 illustrates examples of communication of beam refinement and control information in accordance with some embodiments.
Figure 9:
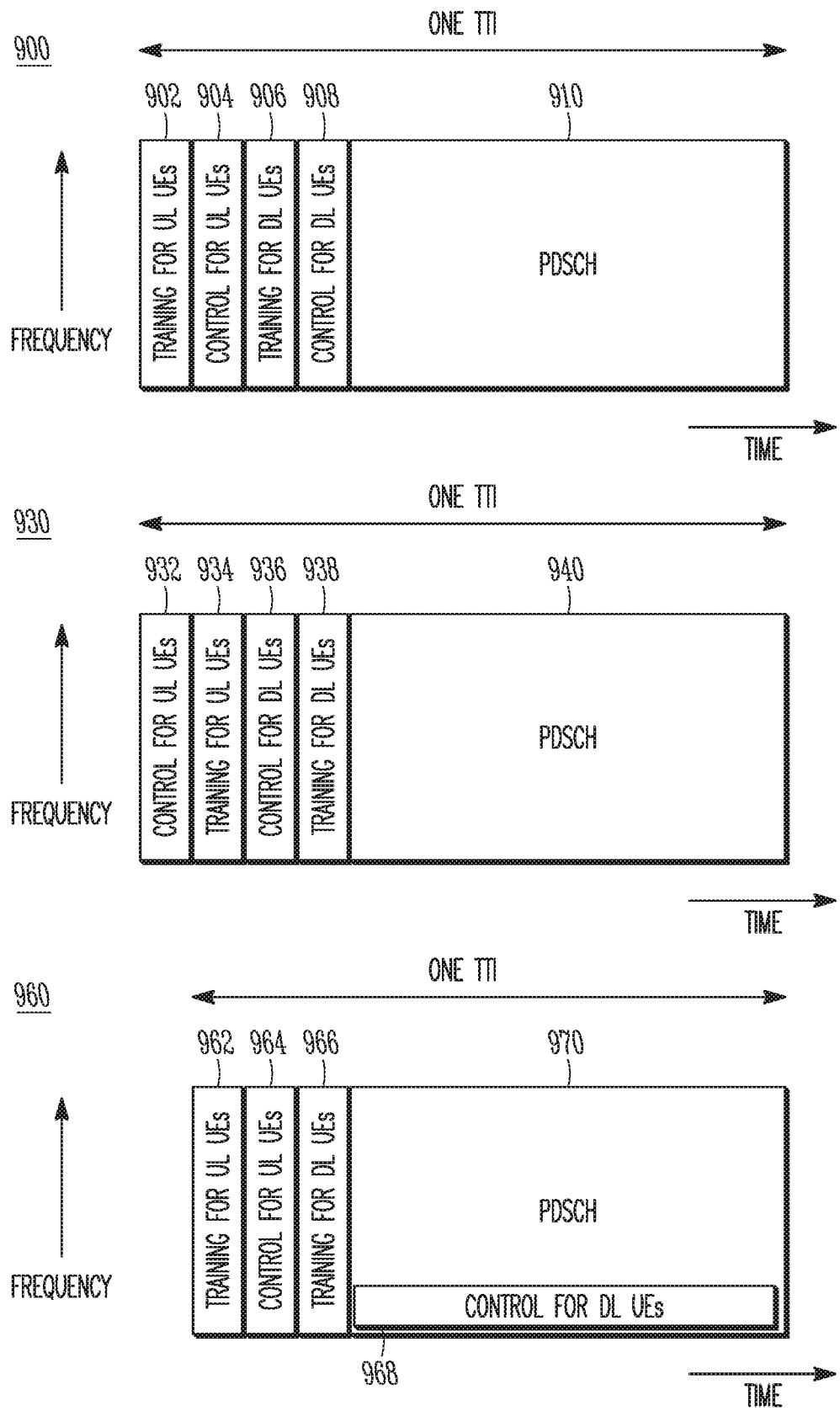
FIG. 9 illustrates examples of downlink sub-frames in accordance with some embodiments.
Figure 10:
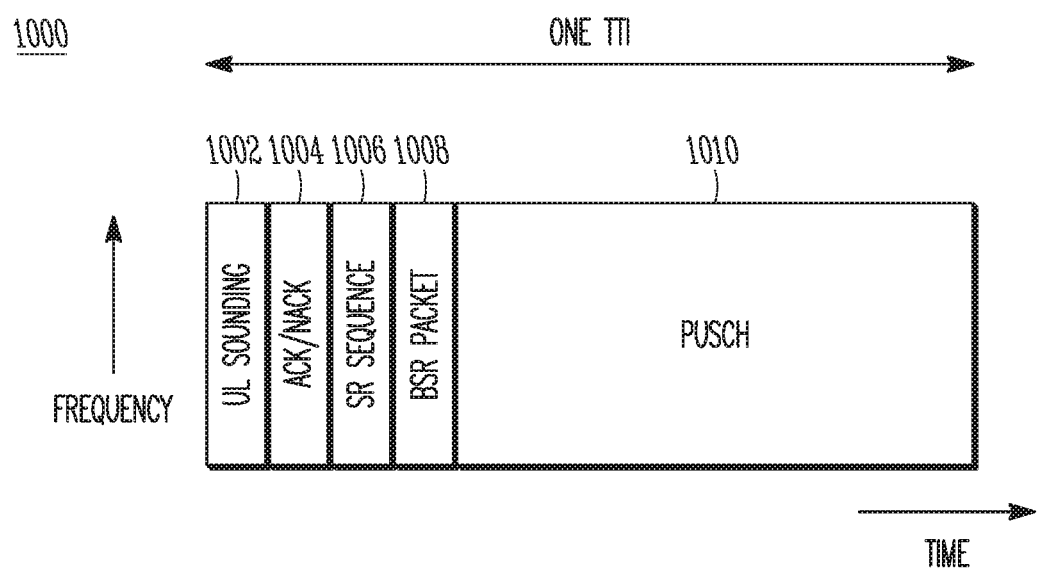
FIG. 10 illustrates an example of an uplink sub-frame in accordance with some embodiments.

FIG. 6 illustrates example frames and sub-frames in accordance with some embodiments. FIG. 7 illustrates example sub-frames in accordance with some embodiments. FIG. 8 illustrates examples of communication of beam refinement and control information in accordance with some embodiments. FIG. 9 illustrates examples of downlink sub-frames in accordance with some embodiments. FIG. 10 illustrates an example of an uplink sub-frame in accordance with some embodiments. It should be noted that although the examples shown in FIGS. 6-10 may illustrate some or all of the techniques, concepts and/or operations described herein, embodiments are not limited to the examples shown in FIGS. 6-10 in terms of number, type or arrangement of frames, sub-frames, messages, data blocks, data channels, information or other aspects.

Referring to FIG. 6, the example downlink frame 600 may include multiple sub-frames such as 610, 620, 630 and/or others. As an example, the sub-frame 610 may include synchronization information, such as the block 615 that occupies a portion of the bandwidth as shown. As another example, the sub-frame 620 may include system information, and may be optional in some cases. As another example, the sub-frames 630 may include control and data information.

The example uplink frame 650 may include multiple sub-frames such as 660, 670, 680 and/or others. As an example, the sub-frame 660 may include random access information, such as the block 665 that occupies a portion of the bandwidth as shown. As another example, the sub-frames 670 may include control and data information. As another example, the sub-frame 680 may include an uplink scheduling request (SR), such as the block 685 that occupies a portion of the bandwidth as shown.

Referring to FIG. 7, the downlink (DL) sub-frame 700 may include a control portion and a data portion, during which the eNB 104 and UE 102 may perform various operations such as those shown in FIG. 7. The uplink (UL) sub-frame 750 may include a control portion and a data portion, during which the eNB 104 and UE 102 may perform various operations such as those shown in FIG. 7.

Referring to FIG. 8, the control portion of a DL sub-frame may be transmitted by the eNB 104 according to two options 810, 820 shown in FIG. 8. The control portion of a UL sub-frame may be transmitted by the eNB 104 according to two options 860, 870 shown in FIG. 8. It should be noted that the example options shown in FIG. 8 are not limiting, as other formats may be used in some embodiments.

In the first option shown for the DL sub-frame, the format 810 includes one or more beam refinement training signals (TS) 812 transmitted before downlink control data 814. In the second option shown for the DL sub-frame, the format 820 includes one or more beam refinement TSs 824 transmitted after downlink control data 822.

In the first option shown for the UL sub-frame, the format 860 includes a beam refinement training signal (TS) 862 transmitted by the UE 102 before the uplink control data 864. In the second option shown for the UL sub-frame, the format 870 includes a beam refinement training signal (TS) 874 transmitted by the UE 102 after the uplink control data 872.

In some embodiments, for the downlink, the NB 104 may transmit a beam refinement TS such as 812, 824 from a beam direction determined during a previous beam training toward scheduled UEs 102. Upon receiving the beam refinement TS, the UEs 102 may perform beam refinement (or determine an updated direction) by adjusting phase shifter values of one or more antenna elements. Similar techniques may be employed for the uplink.

Referring to FIGS. 9 and 10, examples of downlink and uplink sub-frames are illustrated for OFDM scenarios, although embodiments are not limited as such. It should be noted that the sub-frames 900, 930, 960, 1000 and/or others may be transmitted during one time transmission interval (TTI) in some cases, although embodiments are not limited as such. For instance, the TTI may span one millisecond (msec) in some cases, although other intervals may be used.

For the downlink sub-frame format 900, beam refinement TSs may be transmitted before control information. As an example, the beam refinement TSs for UEs 102 scheduled for uplink transmission may be transmitted during one or more OFDM symbols 902, followed by control information for those UEs 102 in one or more OFDM symbols 904. The beam refinement TSs for UEs 102 scheduled for downlink transmission may be transmitted during one or more OFDM symbols 906, followed by control information for those UEs 102 in one or more OFDM symbols 908. In addition, a downlink data portion 910 may use physical downlink shared channel (PDSCH) techniques and/or other techniques in some cases.

For the downlink sub-frame format 930, beam refinement TSs may be transmitted after control information. As an example, the beam refinement TSs for UEs 102 scheduled for uplink transmission may be transmitted during one or more OFDM symbols 934 that follow the control information for those UEs 102 in one or more OFDM symbols 932. The beam refinement TSs for UEs 102 scheduled for downlink transmission may be transmitted during one or more OFDM symbols 938 that follow control information for those UEs 102 in one or more OFDM symbols 936. In addition, a downlink data portion 940 may use physical downlink shared channel (PDSCH) techniques and/or other techniques in some cases.

For the downlink sub-frame format 960, beam refinement TSs may be transmitted before control information. As an example, the beam refinement TSs for UEs 102 scheduled for uplink transmission may be transmitted during one or more OFDM symbols 962, followed by control information for those UEs 102 in one or more OFDM symbols 964. The beam refinement TSs for UEs 102 scheduled for downlink transmission may be transmitted during one or more OFDM symbols 966. Control information for those UEs 102 may be transmitted during one or more OFDM symbols 968. It should be noted that in this example, the control information for the downlink may be transmitted in a portion of the frequency band used for transmission of the other portions (training for UL and DL and control for UL). That is, a longer time period and a smaller frequency portion may be used (in comparison to that used for the training for UL and DL and control for UL) in this example for transmission of the control information 968 for UEs 102 scheduled for transmission, by the eNB 104, of DL data. It should be noted that in some embodiments, the time resources and/or frequency resources used for transmission of any or all of the training and/or control information may be allocated in a similar manner. Embodiments are not limited to allocation of channel resources in a uniform manner, for instance, as shown in examples 900 and 930. In addition, a downlink data portion 970 may use physical downlink shared channel (PDSCH) techniques and/or other techniques in some cases.

For the uplink sub-frame format 1000, UL sounding, ACK/NACK, scheduling request (SR) blocks, buffer status reports (BSR) and/or other information may be transmitted by the UE 102. As an example, an UL sounding waveform or block may be transmitted during one or more OFDM symbols 1002. As another example, one or more ACK/NACK blocks (which may indicate successful or unsuccessful reception of downlink data blocks at the UE 102) may be transmitted in one or more OFDM symbols 1004. As another example, one or more SR blocks may be transmitted during one or more OFDM symbols 1006. As another example, one or more BSR blocks may be transmitted during one or more OFDM symbols 1008. In addition, an uplink data portion 1010 may use physical uplink shared channel (PUSCH) techniques and/or other techniques in some cases. It should be noted that single carrier frequency division multiple access (SC-FDMA) techniques may be used in some cases.

Figure 11:
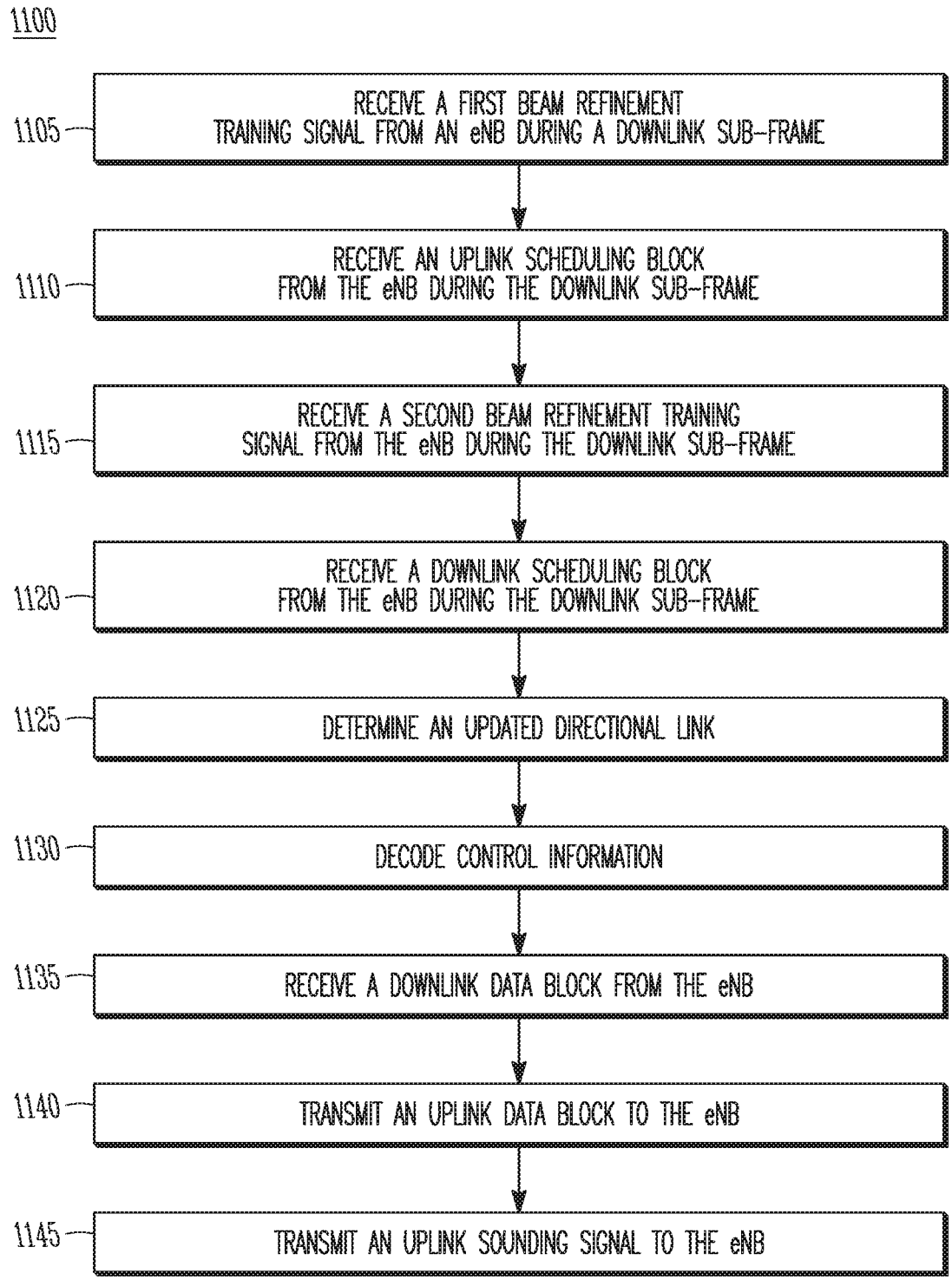
FIG. 11 illustrates the operation of another method of communication in accordance with some embodiments.

FIG. 11 illustrates the operation of another method of communication in accordance with some embodiments. As mentioned previously regarding the method 500, embodiments of the method 1100 may include additional or even fewer operations or processes in comparison to what is illustrated in FIG. 11 and embodiments of the method 1100 are not necessarily limited to the chronological order that is shown in FIG. 11. In describing the method 1100, reference may be made to FIGS. 1-10, although it is understood that the method 1100 may be practiced with any other suitable systems, interfaces and components. In addition, embodiments of the method 1100 may refer to UEs 102, eNBs 104, APs, STAs or other wireless or mobile devices. The method 1100 may also refer to an apparatus for an eNB 104 and/or UE 102 or other device described above.

In addition, previous discussion of various techniques and concepts may be applicable to the method 1100 in some cases, including beam refinement, directional transmission, sounding, scheduling blocks, frames, sub-frames, and others. In addition, some or all aspects of the example frames and sub-frames shown in FIGS. 6-10 may be applicable in some cases.

At operation 1105, the UE 102 may receive a first beam refinement training signal from the eNB 104 during a downlink sub-frame. At operation 1110, the UE 102 may receive one or more uplink scheduling blocks from the eNB 104 during a downlink sub-frame. At operation 1115, the UE 102 may receive a second beam refinement training signal from the eNB 104. At operation 1120, the UE 102 may receive one or more downlink scheduling blocks from the eNB 104. It should be noted that the receptions in operations 1115 and 1120 may be performed during the same downlink sub-frame in some cases, although embodiments are not limited as such. As an example, when the UE 102 is scheduled for an uplink transmission and is also scheduled to receive a downlink data block, the same downlink sub-frame may be used for operations 1105-1120. As another example, when the UE 102 is scheduled for an uplink transmission or is scheduled to receive a downlink data block (but not both), the method 1110 may include operations 1105-1110 or operations 1115-1120, but not all. As another example, operations 1105-1110 may be performed during a first downlink sub-frame and operations 1115-1120 may be performed during a second downlink sub-frame.

Although not limited as such, previously described downlink sub-frame formats may be used in some cases. It should also be noted that embodiments of the method 1100 are not limited to the order shown in FIG. 11. As an example, the beam refinement training signal received at operation 1105 may be received before or after the uplink scheduling block received at operation 1110, depending on the downlink sub-frame format. As another example, the beam refinement training signal received at operation 1115 may be received before or after the uplink scheduling block received at operation 1120, depending on the downlink sub-frame format.

At operation 1125, the UE 102 may determine an updated directional link using beam refinement training signals, such as those received at operations 1105 and/or 1115. As previously described, the signals and/or data blocks described in these and other operations may be transmitted, by the eNB 104, according to a determined transmission direction in some cases. In addition, the signals and/or data blocks may be received, by the UE 102, according to a determined receive direction in some cases.

At operation 1130, the UE 102 may decode control information. For instance, the control information may include uplink scheduling blocks and/or downlink scheduling blocks in some cases. Depending on whether the beam refinement training signal is transmitted before or after the related control information, the control information may be decoded according to a previous direction or the updated direction (from operation 1125).

At operation 1135, the UE 102 may receive one or more downlink data blocks from the eNB 104. In some cases, the reception of the one or more downlink data blocks may be performed according to an updated direction. As previously described, the signals and/or data blocks described in these and other operations may be transmitted, by the eNB 104, according to a determined transmission direction in some cases. In addition, the signals and/or data blocks may be received, by the UE 102, according to a determined receive direction in some cases. In some cases, the reception of the one or more downlink data blocks may be performed according to an updated direction. In addition, the downlink data blocks may be received in time resources and/or frequency resources (channel resources) indicated by the downlink scheduling block.

At operation 1140, the UE 102 may transmit one or more uplink data blocks to the eNB 104. At operation 1145, the UE 102 may transmit an uplink sounding signal to the eNB 104. In addition, the UE 102 may transmit additional information and/or data blocks to the eNB 104. In some embodiments, the uplink data blocks may be transmitted in time resources and/or frequency resources (channel resources) indicated by the uplink scheduling block. As a non-limiting example, the uplink sub-frame format 1000 may be used for these transmissions, although other formats may be used in some cases. In addition, the operations 1140 and 1145 may be performed in a different order than shown in FIG. 11, and some embodiments may not necessarily include both operations. It should also be noted that directional transmission and/or directional reception may be used by the UE 102 and/or the eNB 104 in these and other operations, in some cases.

In Example 1, an apparatus for an Evolved Node-B (eNB) may comprise transceiver circuitry and hardware processing circuitry. The hardware processing circuitry may configure the transceiver circuitry to transmit, during an uplink control portion of a downlink sub-frame, a first beam refinement training signal and an uplink scheduling block to a first User Equipment (UE) according to a downlink transmission direction from the eNB to the first UE. The hardware processing circuitry may further configure the transceiver circuitry to transmit, during a downlink control portion of the downlink sub-frame, a second beam refinement training signal and a downlink scheduling block to a second UE according to a downlink transmission direction from the eNB to the second UE. The uplink scheduling block may indicate scheduled uplink resources for a scheduled uplink transmission by the first UE and the downlink scheduling block may indicate scheduled downlink resources for a scheduled downlink transmission to the second UE.

In Example 2, the subject matter of Example 1, wherein the transmission of the first beam refinement training signal may be to enable tracking, at the first UE, of the downlink transmission direction from the eNB to the first UE. The transmission of the second beam refinement training signal may be to enable tracking, at the second UE, of the downlink transmission direction from the eNB to the second UE.

In Example 3, the subject matter of one or any combination of Examples 1-2, wherein the downlink transmission direction from the eNB to the first UE may be based on previously determined beam-forming weights for a directional link from the eNB to the first UE. The downlink transmission direction from the eNB to the second UE may be based on previously determined beam-forming weights for a directional link from the eNB to the second UE.

In Example 4, the subject matter of one or any combination of Examples 1-3, wherein the eNB may be arranged to transmit at a millimeter wave (mmWave frequency and the downlink sub-frame may be formatted according to an mmWave downlink sub-frame format.

In Example 5, the subject matter of one or any combination of Examples 1-4, wherein the mmWave downlink sub-frame format may include the uplink control portion, the downlink control portion, and a downlink data portion. The uplink control portion may be allocated for transmission, by the eNB, of beam refinement training signals and uplink scheduling blocks to UEs for which uplink transmissions are scheduled. The downlink control portion may be allocated for transmission, by the eNB, of beam refinement training signals and downlink scheduling blocks to UEs for which downlink transmissions are scheduled during the data portion of the downlink sub-frame.

In Example 6, the subject matter of one or any combination of Examples 1-5, wherein the mmWave downlink sub-frame may be formatted according to either a first or a second mmWave downlink sub-frame format. When the downlink sub-frame is formatted according to the first mmWave downlink sub-frame format, the transmission of the beam refinement training signals during the uplink control portion may be performed before the transmission of the uplink scheduling blocks. When the downlink sub-frame is formatted according to the second mmWave downlink sub-frame format, the transmission of the beam refinement training signals during the uplink control portion may be performed after the transmission of the uplink scheduling blocks.

In Example 7, the subject matter of one or any combination of Examples 1-6, wherein the hardware processing circuitry may further configure the transceiver circuitry to transmit during the uplink control portion, to each of multiple UEs for which uplink transmissions are scheduled, a beam refinement training signal and an uplink scheduling block according to a downlink direction for each of the UEs. The hardware processing circuitry may further configure the transceiver circuitry to transmit during the downlink control portion, to each of multiple UEs for which downlink transmissions are scheduled, a beam refinement training signal and a downlink scheduling block according to a downlink direction for each of the UEs.

In Example 8, the subject matter of one or any combination of Examples 1-7, wherein when a first downlink sub-frame format is used, the beam refinement training signals transmitted during the uplink control portion may be transmitted before the uplink scheduling blocks and the beam refinement training signals transmitted during the downlink control portion may be transmitted before the downlink scheduling blocks. When a second downlink sub-frame format is used, the beam refinement training signals transmitted during the uplink control portion may be transmitted after the uplink scheduling blocks and the beam refinement training signals transmitted during the downlink control portion may be transmitted after the downlink scheduling blocks.

In Example 9, the subject matter of one or any combination of Examples 1-8, wherein the first downlink sub-frame format may be used when a number of active UEs is below a predetermined threshold and the second downlink sub-frame format may be used when the number of active UEs is not below the predetermined threshold.

In Example 10, the subject matter of one or any combination of Examples 1-9, wherein the scheduled uplink resources may include uplink time resources and/or uplink frequency resources for the scheduled uplink transmission. The scheduled downlink resources may include downlink time resources and/or downlink frequency resources for the scheduled downlink transmission.

In Example 11, the subject matter of one or any combination of Examples 1-10, wherein the hardware processing circuitry may further configure the transceiver circuitry to receive an uplink data block from the first UE in the uplink time resources and/or uplink frequency resources included in the scheduled uplink resources. The hardware processing circuitry may further configure the transceiver circuitry to transmit a downlink data block to the second UE in the downlink time resources and/or downlink frequency resources included in the scheduled downlink resources. The downlink time resources may be included in the downlink sub-frame.

In Example 12, the subject matter of one or any combination of Examples 1-11, wherein the hardware processing circuitry may further configure the transceiver circuitry to receive, during an uplink data portion of an uplink sub-frame, an uplink data block from the first UE in uplink time and/or uplink frequency resources that are included in the scheduled uplink resources indicated in the uplink scheduling block.

In Example 13, the subject matter of one or any combination of Examples 1-12, wherein the uplink sub-frame may be formatted according to an mmWave uplink sub-frame format. The mmWave uplink sub-frame format may include an uplink sounding portion allocated for transmission of sounding waveforms by UEs and may further include the uplink data portion.

In Example 14, the subject matter of one or any combination of Examples 1-13, wherein the uplink sub-frame may at least partly overlap the downlink sub-frame.

In Example 15, a non-transitory computer-readable storage medium may store instructions for execution by one or more processors to perform operations for communication by an Evolved Node-B (eNB). The operations may configure the one or more processors to configure the eNB to transmit beam refinement training signals and uplink scheduling blocks to a first portion of a group of User Equipments (UEs) during an uplink control portion of a downlink sub-frame. The operations may further configure the one or more processors to configure the eNB to transmit beam refinement training signals and downlink scheduling blocks to a second portion of the group of UEs during a downlink control portion of the downlink sub-frame. The operations may further configure the one or more processors to configure the eNB to receive, from the UEs in the first portion, uplink data blocks during uplink time resources indicated in the uplink scheduling blocks. The operations may further configure the one or more processors to configure the eNB to transmit, to the UEs in the second portion, downlink data blocks during downlink time resources indicated in the downlink scheduling blocks.

In Example 16, the subject matter of Example 15, wherein the beam refinement training signals and uplink scheduling blocks transmitted to the UEs in the first portion may be transmitted according to directional links from the eNB to the UEs in the first portion. The beam refinement training signals and downlink scheduling blocks transmitted to the UEs in the second portion may be transmitted according to directional links from the eNB to the UEs in the second portion.

In Example 17, the subject matter of one or any combination of Examples 15-16, wherein at least some of the directional links from the eNB to the UEs in the first portion may be different. At least some of the directional links from the eNB to the UEs in the second portion may be different.

In Example 18, the subject matter of one or any combination of Examples 15-17, wherein the beam refinement training signals transmitted to the UEs in the first portion may be transmitted to enable tracking, at the UEs in the first portion, of the directional links from the eNB to the UEs in the first portion. The beam refinement training signals transmitted to the UEs in the second portion may be transmitted to enable tracking, at the UEs in the second portion, of the directional links from the eNB to the UEs in the second portion.

In Example 19, the subject matter of one or any combination of Examples 15-18, wherein the downlink time resources in which the downlink data blocks are transmitted to the UEs in the second portion may be included in the downlink sub-frame.

In Example 20, the subject matter of one or any combination of Examples 15-19, wherein the eNB may be arranged to transmit at a millimeter wave (mmWave) frequency and the downlink sub-frame may be formatted according to an mmWave downlink sub-frame format.

In Example 21, an apparatus for a User Equipment (UE) may comprise transceiver circuitry and hardware processing circuitry. The hardware processing circuitry may configure the transceiver circuitry to receive, from an Evolved Node-B (eNB) during an uplink control portion of a downlink sub-frame, a first beam refinement training signal and an uplink scheduling block for an uplink transmission by the UE. The hardware processing circuitry may further configure the transceiver circuitry to transmit an uplink data block to the eNB during uplink time resources indicated in the uplink scheduling block. The hardware processing circuitry may further configure the transceiver circuitry to receive, from the eNB during a downlink control portion of the downlink sub-frame, a second beam refinement training signal and a downlink scheduling block for a downlink data block to be received by the UE. The hardware processing circuitry may further configure the transceiver circuitry to receive the downlink data block from the eNB during downlink time resources indicated in the downlink scheduling block.

In Example 22, the subject matter of Example 21, wherein the uplink time resources used for the transmission of the uplink data block may be included in an uplink sub-frame. The downlink time resources used for the reception of the downlink data block may be included in the downlink sub-frame. The uplink sub-frame may at least partly overlap the downlink sub-frame.

In Example 23, the subject matter of one or any combination of Examples 21-22, wherein the uplink data block may be received in uplink frequency resources that are exclusive to downlink frequency resources in which the downlink data block is received.

In Example 24, the subject matter of one or any combination of Examples 21-23, wherein the beam refinement training signal may be received before the uplink scheduling block. The beam refinement training signal may be received according to a first directional link between the eNB and the UE. The hardware processing circuitry may further configure the transceiver circuitry to determine, based at least partly on the reception of the beam refinement training signal, an updated directional link. The uplink scheduling block may be received according to the updated directional link.

In Example 25, the subject matter of one or any combination of Examples 21-24, wherein the UE may be arranged to receive and transmit at millimeter wave (mmWave) frequencies. The downlink sub-frame may be formatted according to an mmWave downlink sub-frame format. The uplink sub-frame may be formatted according to an mmWave uplink sub-frame format.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an Evolved Node-B (eNB), the apparatus comprising transceiver circuitry and hardware processing circuitry, the hardware processing circuitry to configure the transceiver circuitry to:
   transmit, during an uplink control portion of a downlink sub-frame, a first beam refinement training signal and an uplink scheduling block to a first User Equipment (UE) according to a downlink transmission direction from the eNB to the first UE; and
   transmit, during a downlink control portion of the downlink sub-frame, a second beam refinement training signal and a downlink scheduling block to a second UE according to a downlink transmission direction from the eNB to the second UE,
   wherein the uplink scheduling block indicates scheduled uplink resources for a scheduled uplink transmission by the first UE and the downlink scheduling block indicates scheduled downlink resources for a scheduled downlink transmission to the second UE,
   when the eNB is arranged to transmit at a millimeter wave (mmWave) frequency and the downlink sub-frame is formatted according to an mmWave downlink sub-frame format:
      the mmWave downlink sub-frame format includes the uplink control portion, the downlink control portion, and a downlink data portion,
      the uplink control portion is allocated for transmission, by the eNB, of beam refinement training signals and uplink scheduling blocks to UEs for which uplink transmissions are scheduled,
      the downlink control portion is allocated for transmission, by the eNB, of beam refinement training signals and downlink scheduling blocks to UEs for which downlink transmissions are scheduled during the data portion of the downlink sub-frame,
      the mmWave downlink sub-frame is formatted according to either a first or a second mmWave downlink sub-frame format,
      when the downlink sub-frame is formatted according to the first mmWave downlink sub-frame format, the transmission of the beam refinement training signals during the uplink control portion is performed before the transmission of the uplink scheduling blocks, and
      when the downlink sub-frame is formatted according to the second mmWave downlink sub-frame format, the transmission of the beam refinement training signals during the uplink control portion is performed after the transmission of the uplink scheduling blocks.

2. The apparatus according to claim 1, wherein:
   the transmission of the first beam refinement training signal is to enable tracking, at the first UE, of the downlink transmission direction from the eNB to the first UE, and
   the transmission of the second beam refinement training signal is to enable tracking, at the second UE, of the downlink transmission direction from the eNB to the second UE.

3. The apparatus according to claim 1, wherein:
   the downlink transmission direction from the eNB to the first UE is based on previously determined beamforming weights for a directional link from the eNB to the first UE, and
   the downlink transmission direction from the eNB to the second UE is based on previously determined beamforming weights for a directional link from the eNB to the second UE.

4. The apparatus according to claim 1, the hardware processing circuitry to further configure the transceiver circuitry to:
   transmit during the uplink control portion, to each of multiple UEs for which uplink transmissions are scheduled, a beam refinement training signal and an uplink scheduling block according to a downlink direction for each of the UEs; and
   transmit during the downlink control portion, to each of multiple UEs for which downlink transmissions are scheduled, a beam refinement training signal and a downlink scheduling block according to a downlink direction for each of the UEs.

5. The apparatus according to claim 4, wherein:
   when a first downlink sub-frame format is used, the beam refinement training signals transmitted during the uplink control portion are transmitted before the uplink scheduling blocks and the beam refinement training signals transmitted during the downlink control portion are transmitted before the downlink scheduling blocks, and
   when a second downlink sub-frame format is used, the beam refinement training signals transmitted during the uplink control portion are transmitted after the uplink scheduling blocks and the beam refinement training signals transmitted during the downlink control portion are transmitted after the downlink scheduling blocks.

6. The apparatus according to claim 5, wherein the first downlink sub-frame format is used when a number of active UEs is below a predetermined threshold and the second downlink sub-frame format is used when the number of active UEs is not below the predetermined threshold.

7. The apparatus according to claim 1, wherein:
the scheduled uplink resources include uplink time resources and/or uplink frequency resources for the scheduled uplink transmission, and
the scheduled downlink resources include downlink time resources and/or downlink frequency resources for the scheduled downlink transmission.

8. The apparatus according to claim 7, the hardware processing circuitry to further configure the transceiver circuitry to:
receive an uplink data block from the first UE in the uplink time resources and/or uplink frequency resources included in the scheduled uplink resources; and
transmit a downlink data block to the second UE in the downlink time resources and/or downlink frequency resources included in the scheduled downlink resources,
wherein the downlink time resources are included in the downlink sub-frame.

9. The apparatus according to claim 1, the hardware processing circuitry to configure the transceiver circuitry to receive, during an uplink data portion of an uplink sub-frame, an uplink data block from the first UE in uplink time and/or uplink frequency resources that are included in the scheduled uplink resources indicated in the uplink scheduling block.

10. The apparatus according to claim 9, wherein:
the uplink sub-frame is formatted according to a mmWave uplink sub-frame format, and
the mmWave uplink sub-frame format includes an uplink sounding portion allocated for transmission of sounding waveforms by UEs and further includes the uplink data portion.

11. The apparatus according to claim 9, wherein the uplink sub-frame at least partly overlaps the downlink sub-frame.

12. The apparatus according to claim 1, wherein:
during the uplink control portion of the downlink sub-frame, first beam refinement training signals and uplink scheduling blocks are transmitted to a first portion of a group of UEs, the first portion of the group of UEs comprising the first UE, and
during the downlink control portion of the downlink sub-frame, second beam refinement training signals and downlink scheduling blocks are transmitted to a second portion of a group of UEs, the second portion of the group of UEs comprising the second UE.

13. A non-transitory computer-readable storage medium that stores instructions for execution by one or more processors to perform operations for communication by an Evolved Node-B (eNB), the operations to configure the one or more processors to configure the eNB to:
transmit, during an uplink control portion of a downlink sub-frame, a first beam refinement training signal and an uplink scheduling block to a first User Equipment (UE) according to a downlink transmission direction from the eNB to the first UE; and
transmit, during a downlink control portion of the downlink sub-frame, a second beam refinement training signal and a downlink scheduling block to a second UE according to a downlink transmission direction from the eNB to the second UE,
wherein the uplink scheduling block indicates scheduled uplink resources for a scheduled uplink transmission by the first UE and the downlink scheduling block indicates scheduled downlink resources for a scheduled downlink transmission to the second UE,
when the eNB is arranged to transmit at a millimeter wave (mmWave) frequency and the downlink sub-frame is formatted according to an mmWave downlink sub-frame format:
the mmWave downlink sub-frame format includes the uplink control portion, the downlink control portion, and a downlink data portion,
the uplink control portion is allocated for transmission, by the eNB, of beam refinement training signals and uplink scheduling blocks to UEs for which uplink transmissions are scheduled,
the downlink control portion is allocated for transmission, by the eNB, of beam refinement training signals and downlink scheduling blocks to UEs for which downlink transmissions are scheduled during the data portion of the downlink sub-frame,
the mmWave downlink sub-frame is formatted according to either a first or a second mmWave downlink sub-frame format,
when the downlink sub-frame is formatted according to the first mmWave downlink sub-frame format, the transmission of the beam refinement training signals during the uplink control portion is performed before the transmission of the uplink scheduling blocks, and
when the downlink sub-frame is formatted according to the second mmWave downlink sub-frame format, the transmission of the beam refinement training signals during the uplink control portion is performed after the transmission of the uplink scheduling blocks.

14. The non-transitory computer-readable storage medium according to claim 13, wherein:
the transmission of the first beam refinement training signal is to enable tracking, at the first UE, of the downlink transmission direction from the eNB to the first UE, and
the transmission of the second beam refinement training signal is to enable tracking, at the second UE, of the downlink transmission direction from the eNB to the second UE.

15. The non-transitory computer-readable storage medium according to claim 13, wherein:
the downlink transmission direction from the eNB to the first UE is based on previously determined beam-forming weights for a directional link from the eNB to the first UE, and
the downlink transmission direction from the eNB to the second UE is based on previously determined beam-forming weights for a directional link from the eNB to the second UE.

16. The non-transitory computer-readable storage medium according to claim 13, wherein the operations further configure the one or more processors to configure the eNB to:
transmit during the uplink control portion, to each of multiple UEs for which uplink transmissions are scheduled, a beam refinement training signal and an uplink scheduling block according to a downlink direction for each of the UEs; and transmit during the downlink control portion, to each of multiple UEs for which downlink transmissions are scheduled, a beam refinement training signal and a downlink scheduling block according to a downlink direction for each of the UEs.

17. The non-transitory computer-readable storage medium according to claim 16, wherein:

when a first downlink sub-frame format is used, the beam refinement training signals transmitted during the uplink control portion are transmitted before the uplink scheduling blocks and the beam refinement training signals transmitted during the downlink control portion are transmitted before the downlink scheduling blocks, and when a second downlink sub-frame format is used, the beam refinement training signals transmitted during the uplink control portion are transmitted after the uplink scheduling blocks and the beam refinement training signals transmitted during the downlink control portion are transmitted after the downlink scheduling blocks.

18. The non-transitory computer-readable storage medium according to claim 17, wherein the first downlink sub-frame format is used when a number of active UEs is below a predetermined threshold and the second downlink sub-frame format is used when the number of active UEs is not below the predetermined threshold.

19. The non-transitory computer-readable storage medium according to claim 13, wherein:

the scheduled uplink resources include uplink time resources and/or uplink frequency resources for the scheduled uplink transmission, and the scheduled downlink resources include downlink time resources and/or downlink frequency resources for the scheduled downlink transmission.

20. The non-transitory computer-readable storage medium according to claim 19, wherein the operations further configure the one or more processors to configure the eNB to:

receive an uplink data block from the first UE in the uplink time resources and/or uplink frequency resources included in the scheduled uplink resources; and transmit a downlink data block to the second UE in the downlink time resources and/or downlink frequency resources included in the scheduled downlink resources, wherein the downlink time resources are included in the downlink sub-frame.

21. The non-transitory computer-readable storage medium according to claim 13, wherein the operations further configure the one or more processors to configure the eNB to receive, during an uplink data portion of an uplink sub-frame, an uplink data block from the first UE in uplink time and/or uplink frequency resources that are included in the scheduled uplink resources indicated in the uplink scheduling block.

22. The non-transitory computer-readable storage medium according to claim 21, wherein:

the uplink sub-frame is formatted according to a mmWave uplink sub-frame format, and the mmWave uplink sub-frame format includes an uplink sounding portion allocated for transmission of sounding waveforms by UEs and further includes the uplink data portion.

23. The non-transitory computer-readable storage medium according to claim 21, wherein the uplink sub-frame at least partly overlaps the downlink sub-frame.

24. The non-transitory computer-readable storage medium according to claim 13, wherein:

during the uplink control portion of the downlink sub-frame, first beam refinement training signals and uplink scheduling blocks are transmitted to a first portion of a group of UEs, the first portion of the group of UEs comprising the first UE, and during the downlink control portion of the downlink sub-frame, second beam refinement training signals and downlink scheduling blocks are transmitted to a second portion of a group of UEs, the second portion of the group of UEs comprising the second UE.

25. An apparatus for an Evolved Node-B (eNB), the apparatus comprising transceiver circuitry and hardware processing circuitry, the hardware processing circuitry to configure the transceiver circuitry to:

transmit, during an uplink control portion of a downlink sub-frame, a first beam refinement training signal and an uplink scheduling block to a first User Equipment (UE) according to a downlink transmission direction from the eNB to the first UE; and transmit, during a downlink control portion of the downlink sub-frame, a second beam refinement training signal and a downlink scheduling block to a second UE according to a downlink transmission direction from the eNB to the second UE, wherein the uplink scheduling block indicates scheduled uplink resources for a scheduled uplink transmission by the first UE and the downlink scheduling block indicates scheduled downlink resources for a scheduled downlink transmission to the second UE, wherein the hardware processing circuitry further configures the transceiver circuitry to:

transmit during the uplink control portion, to each of multiple UEs for which uplink transmissions are scheduled, a beam refinement training signal and an uplink scheduling block according to a downlink direction for each of the UEs; and transmit during the downlink control portion, to each of multiple UEs for which downlink transmissions are scheduled, a beam refinement training signal and a downlink scheduling block according to a downlink direction for each of the UEs, when a first downlink sub-frame format is used, the beam refinement training signals transmitted during the uplink control portion are transmitted before the uplink scheduling blocks and the beam refinement training signals transmitted during the downlink control portion are transmitted before the downlink scheduling blocks, and when a second downlink sub-frame format is used, the beam refinement training signals transmitted during the uplink control portion are transmitted after the uplink scheduling blocks and the beam refinement training signals transmitted during the downlink control portion are transmitted after the downlink scheduling blocks.

26. The apparatus according to claim 25, wherein the first downlink sub-frame format is used when a number of active UEs is below a predetermined threshold and the second downlink sub-frame format is used when the number of active UEs is not below the predetermined threshold.

27. The apparatus according to claim 25, wherein:
the scheduled uplink resources include uplink time resources and/or uplink frequency resources for the scheduled uplink transmission,
the scheduled downlink resources include downlink time resources and/or downlink frequency resources for the scheduled downlink transmission, and
the hardware processing circuitry further configures the transceiver circuitry to:
 receive an uplink data block from the first UE in the uplink time resources and/or uplink frequency resources included in the scheduled uplink resources; and
 transmit a downlink data block to the second UE in the downlink time resources and/or downlink frequency resources included in the scheduled downlink resources,
 wherein the downlink time resources are included in the downlink sub-frame.

\* \* \* \* \*